United States Patent
Yo et al.

(10) Patent No.: US 6,330,996 B1
(45) Date of Patent: Dec. 18, 2001

(54) MOUNTING FIXTURE FOR CPU OF A PORTABLE-TYPE COMPUTER SYSTEM

(75) Inventors: Yu-Shi Yo; Tsung-Hsing Fang; Teh-Chuan Ou, all of Taipei (TW)

(73) Assignee: Asustek Computer, Inc., Taipei (TW)

( * ) Notice: Subject to any disclaimer, the term of this patent is extended or adjusted under 35 U.S.C. 154(b) by 0 days.

(21) Appl. No.: 09/520,094

(22) Filed: Mar. 8, 2000

(30) Foreign Application Priority Data

May 10, 1999 (TW) ................................................. 88207380

(51) Int. Cl.[7] ................................ A47F 5/00; H05K 7/02; H05K 7/06; H05K 7/08; H05K 7/10
(52) U.S. Cl. ............................ 248/694; 361/760; 439/66; 248/309.1
(58) Field of Search ................................. 248/309.1, 510, 248/694; 361/760, 756; 439/66

(56) References Cited

U.S. PATENT DOCUMENTS

| | | | |
|---|---|---|---|
| 4,793,814 | * 12/1988 | Zifcak et al. ........................... | 439/66 |
| 5,046,953 | * 9/1991 | Shreeve et al. ........................ | 439/66 |
| 5,155,905 | * 10/1992 | Miller, Jr. ............................. | 361/400 |
| 5,557,504 | * 9/1996 | Siegel et al. .......................... | 361/774 |
| 5,823,495 | * 10/1998 | Joss et al. ........................... | 248/309.1 |
| 5,996,956 | * 12/1999 | Shawver ............................. | 248/309.1 |

FOREIGN PATENT DOCUMENTS 84204505    8/1995 (TW).

* cited by examiner

Primary Examiner—Ramon O. Ramirez
Assistant Examiner—J. DeLuca
(74) Attorney, Agent, or Firm—Harness, Dickey & Pierce, P.L.C.

(57) ABSTRACT

A fixture for mounting a CPU into a portable-type computer system having a motherboard with a mounting location is provided. The fixture includes a first device, a second device and a third device. The first device is responsive to a force and re-directs the force to a predetermined force-taking location of the CPU. The second device supports the first device and includes a through-hole. The third device is connected to the second means and positions the CPU onto the mounting location such that a predetermined alignment relationship between the CPU and the mounting location is maintained.

7 Claims, 7 Drawing Sheets

MOUNTING FIXTURE FOR CPU OF A PORTABLE-TYPE COMPUTER SYSTEM

FIELD OF INVENTION

The invention relates to a fixture for mounting a CPU into a portable-type computer system.

BACKGROUND OF INVENTION

Portable-type computer has gained popularity recently due to the portability, light weight and endurance of rechargable battery power. Nowadays, most portable-type computer can operate continuously for more than 8 hours with the fully-charged battery initially.

It is obvious that to install each and every required components into a limited space provided by a portable-type computer system, the assembly process of the portable-type computer system is far more difficult than that of a desktop-type computer system.

FIG. 1 shows how a CPU 70 is mounted to a predetermined socket region 74 of the motherboard of a portable-type computer system. The CPU 70 for portable-type computer system is generally in form of rectangular slice chip with a multiple of positioning holes 11. The corresponding mounting region of motherboard includes a multiple of positioning holes 14 to be aligned with the positioning holes 11 of CPU 70 during mounting process. The area 12 shown is the heat dissipation area of CPU 70. The input and output pins (not shown) are provided on the bottom surface of CPU 70 and respectively contact with gold fingers 72 on the motherboard when the mounting procedure is complete.

Due to only limited space is available during mounting of CPU, the input or output pins of CPU or some components near the socket region 74 may suffer damage if the mounting operation is made by an in-experience operator. In addition, transistors fabricated within the slice form CPU may also suffer damage, which can not be detected by naked eyes, if the applied force is not adequate either in direction or in magnitude.

In order to prevent the possible damage recited above, the following requirement are to be met. The CPU 70 must be positioned at the accurate predetermined location of motherboard. Secondly, the actual location of force applied on the CPU 70 and the magnitude of the force must be accurate.

One prior art technology regarding the invention is disclosed in Taiwan Patent Application 84204505 which was filed on Apr. 10, 1995 and issued as publication no. 255584 on Aug. 21, 1995.

SUMMARY OF INVENTION

To achieve the above requirements, the invention provides a fixture for mounting the CPU to the specified socket region of the motherboard. The fixture provided enables an in-experience operator to mount the CPU without making damage to the CPU and nearby components on the motherboard.

A fixture for mounting a CPU into a portable-type computer system having a motherboard with a mounting location is provided. The fixture includes a first device, a second device and a third device. The first device is responsive to a force and re-directs the force to a predetermined force-taking location of the CPU. The second device supports the first device and includes a through-hole. The third device is connected to the second means and positions the CPU onto the mounting location such that a predetermined alignment relationship between the CPU and the mounting location is maintained.

DESCRIPTIONS OF DRAWINGS

Figure 5:
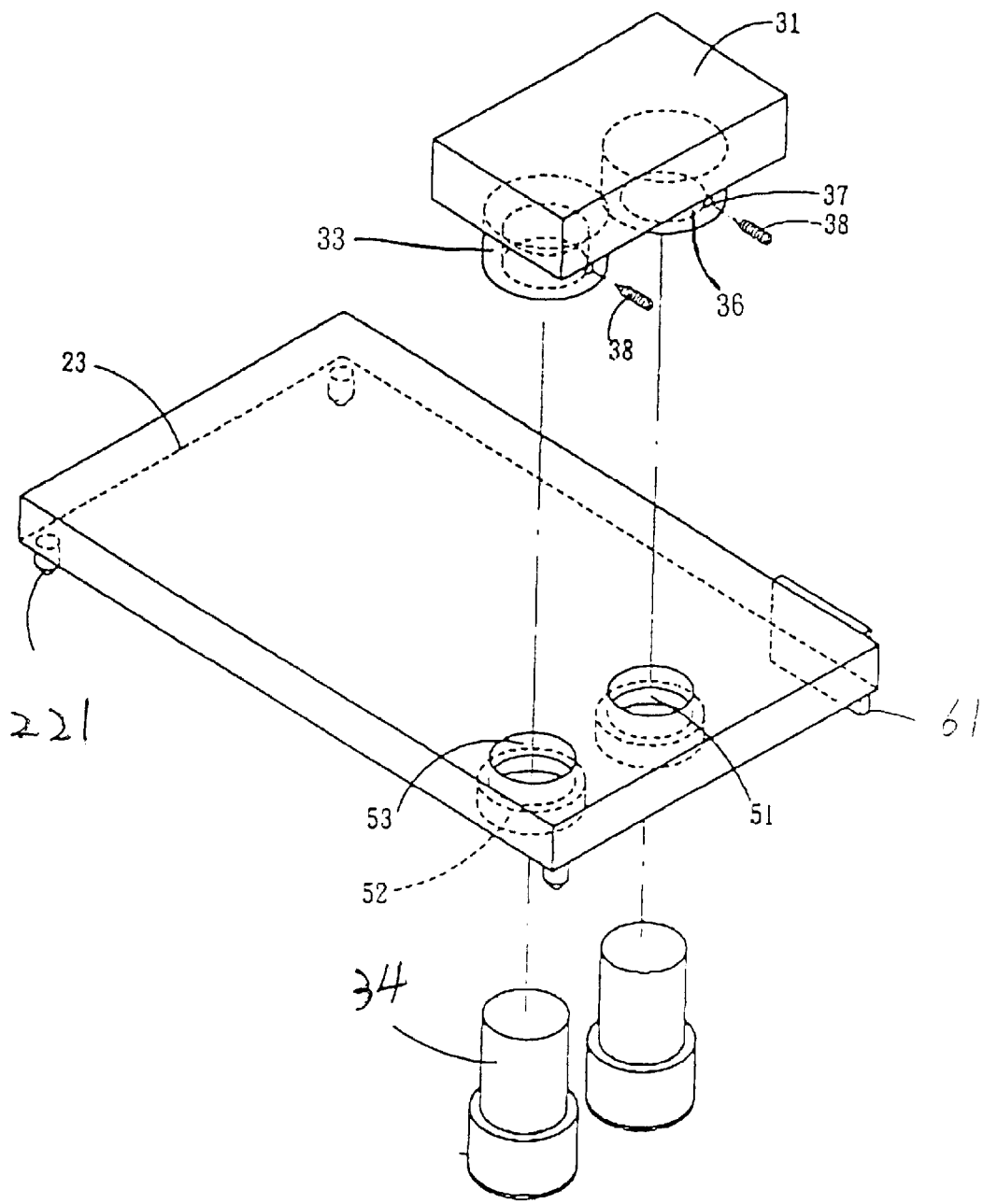

FIG. 5 shows the relationship of the components of the first device 21 relative to the second device 23 and the third device 22.

Figure 6:
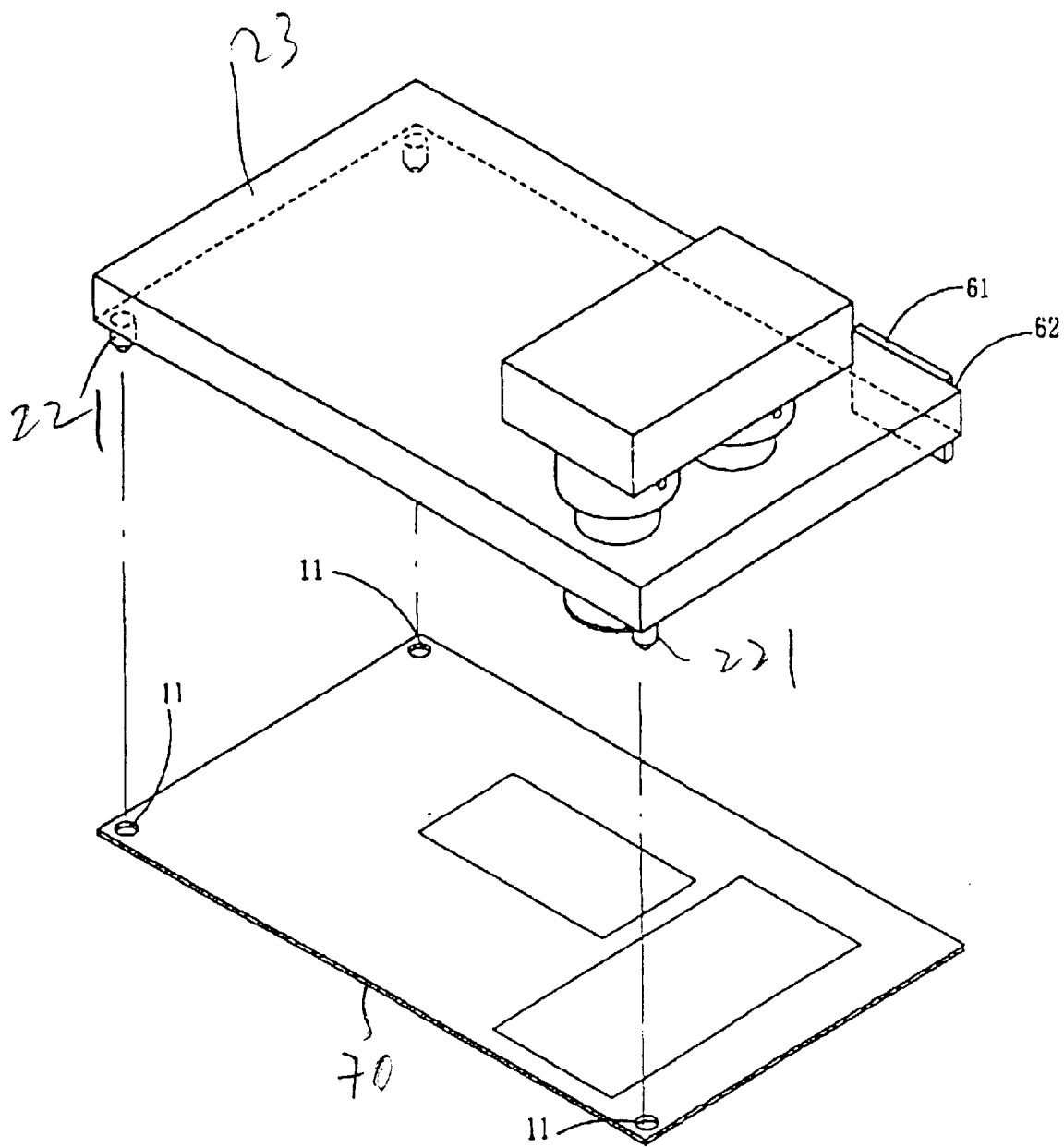

FIG. 6 shows how the second device 23, together with the third device 22, aligns to the CPU 70 before mounting operation is performed.

Figure 7C:
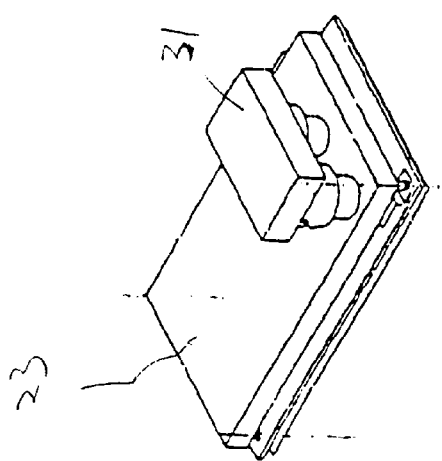
Figure 7B:
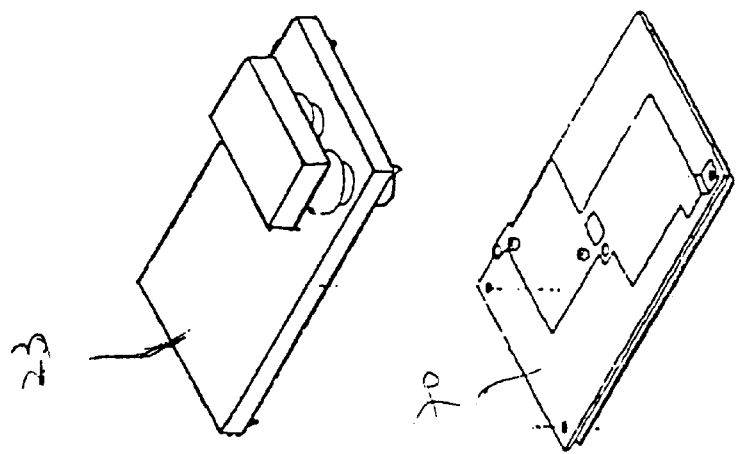
Figure 7A:
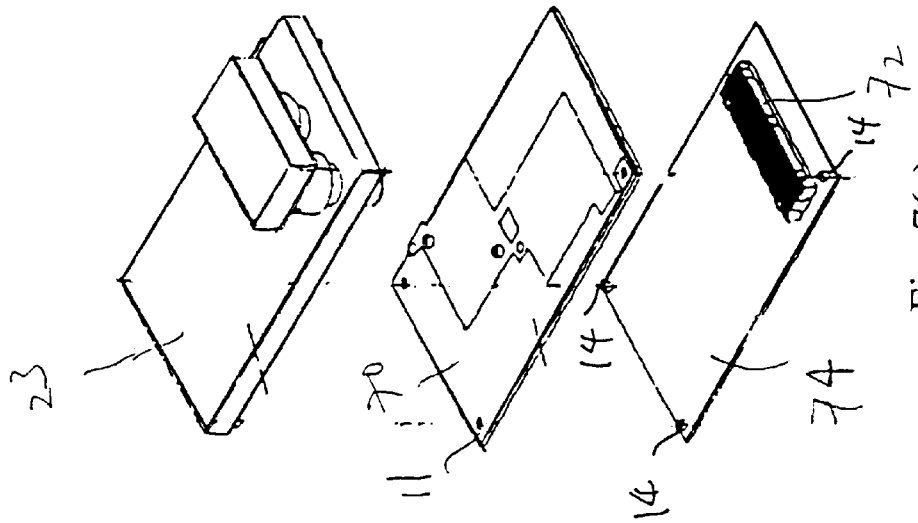

FIG. 7(a) shows components relationship of the pre-alignment stage.

FIG. 7(b) shows the alignment stage of the CPU 70 with respect to the predetermined socket region 74 of the mounting location of motherboard.

FIG. 7(c) shows the force exertion stage using the fixture of the present invention.

DESCRIPTION OF EMBODIMENT

Figure 1:
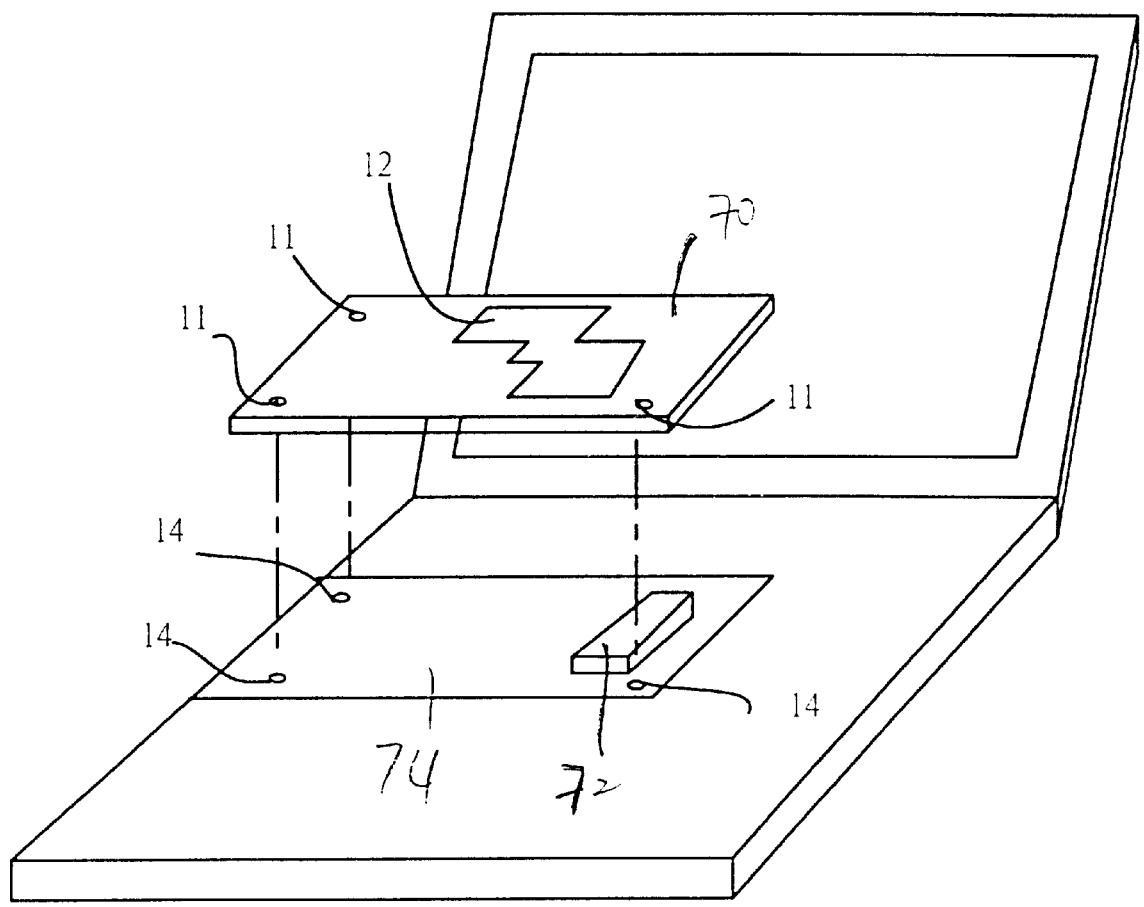
FIG. 1 shows how the CPU is mounted to the mounting location of motherboard of a portable type computer according to prior art.
Figure 2:
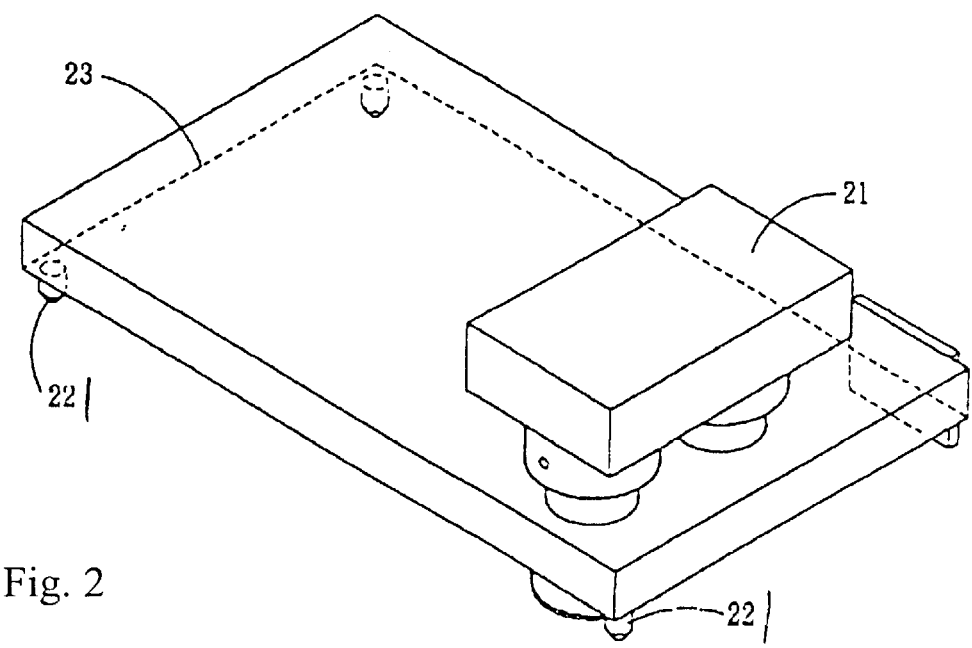
FIG. 2 shows the mounting fixture provided by the invention in assembly form.

Referring to FIG. 2, the fixture of the invention includes a first device 21, a second device 23 and a third device 22. The first device 21 is responsive to a force and re-directs the force to a predetermined force-taking location of the CPU to be mounted. The second device 23 functions to carry the first device 21, and the second device 23 has a through-hole 51, shown in FIG. 4, allowing passage of a movable part 34 which will recited further hereinafter. The third device 22 is connected to the second device 23 and functions to position the CPU relative to the mounting location of motherboard such that a predetermined alignment relationship between the CPU and the mounting location is maintained during mounting process.

Figure 3A:
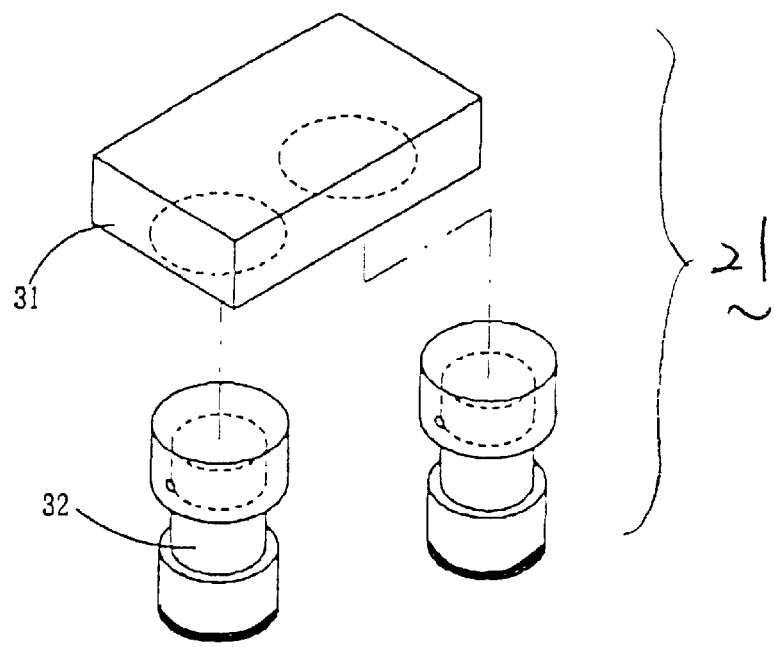
FIG. 3(a) shows the first device 21 of FIG. 2 in explosive view.
Figure 3B:
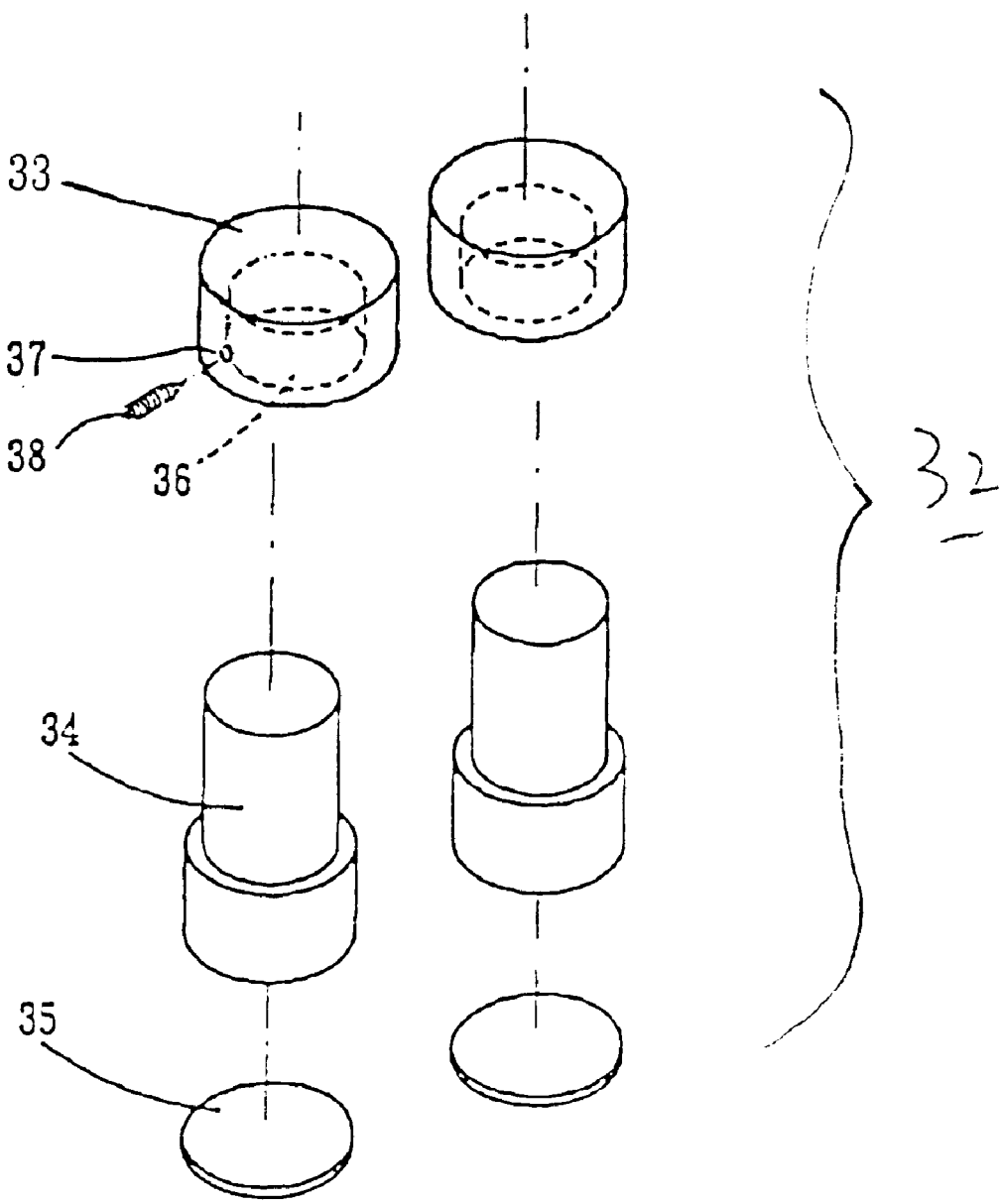
FIG. 3(b) shows the explosive view of the transfer device 32 in FIG. 3(a).

Referring to FIG. 3(a), the first device 21 includes a load carry device 31 and a a load transfer device 32. The force to mount the CPU is applied on the load carry device 31. In a preferred embodiment, the load carry device 31 may be a rectangular block of plastic or metal material. As shown in FIG. 3(b), the transfer device 32 includes a stationary portion 33, a movable portion 34 and a cushion portion 35. And the bottom surface of the load carry device 31 is larger than the bottom surface area of the transfer device 32. The top end (stationary portion 33) of the transfer device 32 is tightly attached into a cavity provided over the bottom portion of the load carry device 31, as shown in FIG. 5. As the external load is applied to the load carry device 31, the load is transferred and redirected by the transfer device 32. Then the redirected force is applied to a predetermined force-taking location of the CPU by the cushion portion 35.

As shown in FIG. 5, the stationary portion 33 is connected to the load carry device 31 through an engagement of the stationary portion 33 into a cavity provided on a lower portion of the load carry device 31. As shown in FIG. 3(a), there is provided a cavity 36 at the bottom portion of the stationary portion 33 which functions to receive the movable portion 34. In order to attach the movable portion 34 to the stationary portion 33, a female screw 37 over the wall of the stationary portion 33 and a screw 37 are provided. As the movable portion 34 is inserted into the cavity 36, the male screw 38 screws into the female screw 37 and presses against the outer wall of the movable portion 34 to achieve the connection function. The cushion portion 35 adheres to a bottom surface of the movable portion 34 to distribute the force applied on the CPU evenly and to avoid making scratch on the surface of CPU. The material used to implement the load carry device 31, the stationary portion 33 and the movable portion 34 includes any material having anti-electrostatic property, i.e. electricity-conducting plastics or metal. The material for cushion portion 35 includes soft sponge or soft rubber.

The material used to make the second device 23 includes any material having anti-electrostatic property, i.e. electricity-conducting plastics or metal. The size of bottom surface of the second device 23 is selected to be equal to that of CPU to be mounted. In this way, force exerted would not accidentally falls out of the target socket region and would not damage nearby components.

Figure 4:
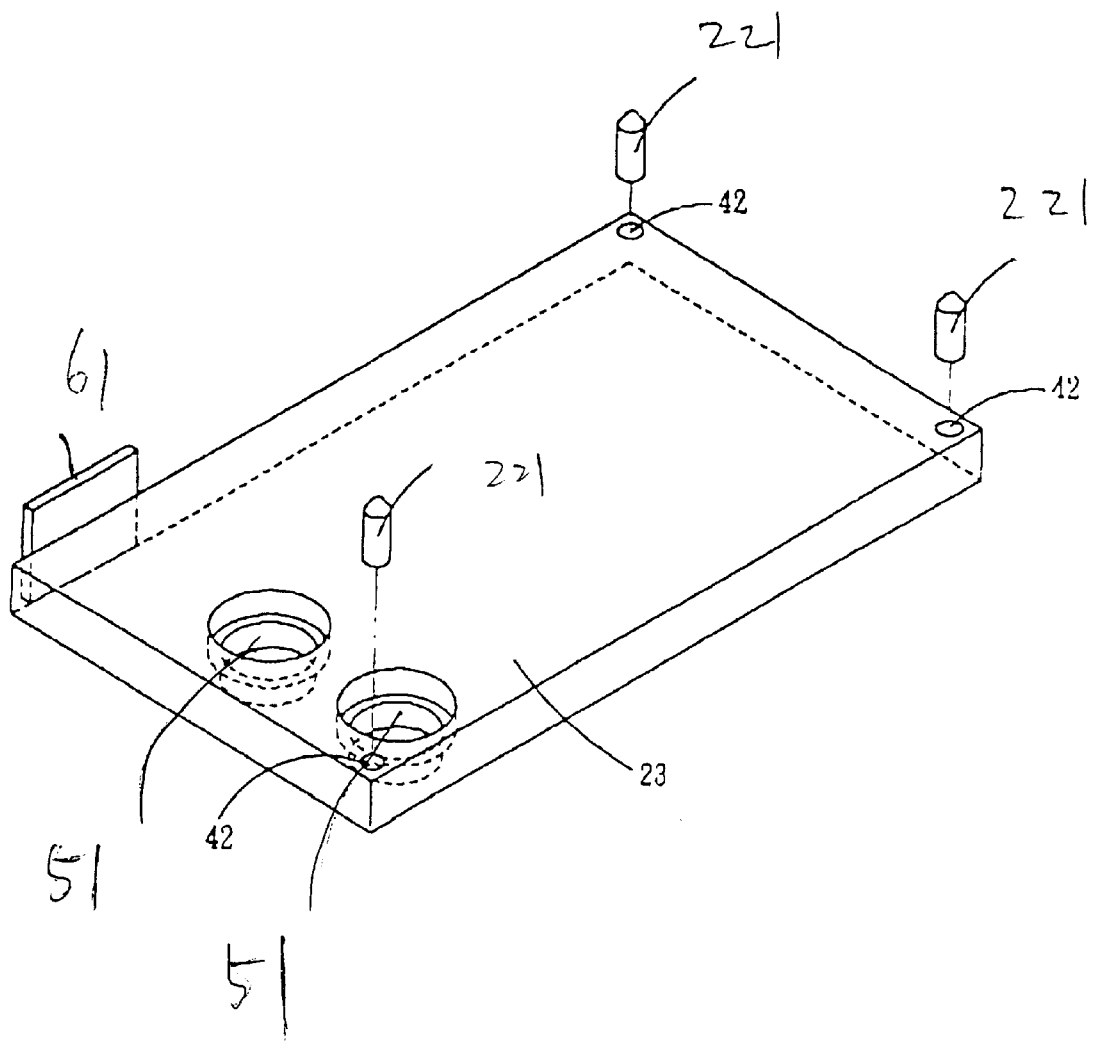
FIG. 4 shows the second device 23 and the third device 22 of the mounting fixture with the bottom surface thereof facing the viewer.

As shown in FIGS. 4, 5, the second device 23 includes at least one through-holes 51, and cavities 42 for receiving the positioning pins 221. The through-hole 51 allows passage of the movable portion 34 of the transfer device 32. As shown, the through-hole defines a slot with two different inner diameters such that the upward movement of movable portion 34 is limited by the slot of smaller inner diameter. In the FIG. 5, the slot of larger diameter is designated as numeral 52 and the slot of smaller diameter is designated as numeral 53.

Referring to FIG. 4, the third device 22 consists of multiple of positioning pins 221 each made of hard plastics material or metal. The positioning pins 221 are respectively received in the corresponding cavities 42 and attached to the second device 23. During alignment stage, the positioning pins 221 respectively passes through the positioning holes 11 on the CPU 70 and afterwards, the corresponding alignment holes 14 on the mounting location 74 of motherboard. As such, the predetermined alignment relationship between them is achieved and no displacement phenomenon is occurred during mounting process of the CPU.

Furthermore, the third device 22 may include a supporting device 61, as illustrated in FIGS. 4 and 6, provided at location near which no positioning pin 221 is provided. The supporting device 61 is made of anti-electrostatic material, i.e. the electricity-conducting plastics, and functions to enhance the stability of the second device 23 during mounting process of CPU. As illustrated, at corner 62 of the second device 23, no pin 221 exists, therefore, the supporting device 61 may help preventing the tilting of the second device 23 while the external force is applied to the fixture of invention.

The assembly process of the mounting fixture of invention is recited below with referencing to FIG. 5.

(1) Connect the stationary portion 33 to the load carry device 31 first.

(2) Make the movable portion 34 to pass through the corresponding through-hole 51 of second device 23. Afterwards, let one end of the movable portion 34 be inserted into the corresponding cavity 36 provided on the stationary portion 33. Attach the movable portion 34 to the stationary portion 33 by screwing the male screw 38 into the female screw 37 and against the wall of movable portion 34.

(3) Attach the positioning pins 221 to the second device 23 through mounting into the corresponding receiving cavities 42.

The procedures involved when mounting the CPU are as follows with referencing to FIG. 7(a), FIG. 7(b) and FIG. 7(c).

(1) As shown in FIG. 7(a), place the CPU 70 onto the mounting location 74 by making the positioning hole 11 aligned to corresponding positioning hole 14 on the mounting location 74.

(2) With the positioning pins 221 respectively passing through the positioning holes 11 and positioning holes 14 as shown in FIG. 7(b), the mounting fixture is placed over the CPU at the predetermined location shown in FIG. 7(c).

(3) Under the condition shown in FIG. 7(c), the external force is exerted over the load carry device 31. The force applied is then redirected by the transfer device 32, and the cushion portion 35 of transfer device 32 applies a force to the CPU which mounts the CPU into the mounting location 74 of motherboard.

With the assistance of positioning pins 221, during mounting operation, no unexpected displacement of CPU will occur. With provision of the transfer device 32, the force actually applied will be onto the predetermined force-taking location of CPU. Other components over the motherboard near the CPU mounting region will not experience any un-expected force as designed.

What is claimed is:

1. A fixture for mounting a CPU into a portable-type computer system having a motherboard with a mounting location, comprising:

first means, responsive to a force, for re-directing said force to a predetermined force-taking location of the CPU;

second means for supporting the first means, the second means having a through-hole;

third means, connected to the second means, for positioning the CPU onto the mounting location such that a predetermined alignment relationship between the CPU and the mounting location is maintained.

2. The fixture of claim 1, wherein the first means comprises:

load carry means for carrying the force;

transfer means, coupled to the load carry means, for re-directing the force to said CPU such that the CPU is mounted to the mounting location.

3. The fixture of claim 2, wherein the transfer means comprises:

stationary means connected to a lower portion of the load carry means, said stationary means having a cavity;

movable means disposed within the through-hole of the second means and removably connected to the stationary means, the movable means having one end received in said cavity of the stationary means;

cushion means adhered to a bottom surface of the movable means.

4. The fixture of claim 3, wherein the stationary means further comprises:

a female screw provided on a side wall of the stationary means, a male screw passing through the female screw for fixing the movable means to the stationary means.

5. The fixture of claim 3, wherein the through-hole of the second means allows passage of the movable means such that the first means is movable along the through-hole.

6. The fixture of claim 1, wherein the third means comprises a plurality of positioning pins, each positioning pin passing through corresponding holes on the CPU and mounting location for preventing displacement of the CPU from the mounting location during CPU mounting operation.

7. The fixture of claim 1, the third means further comprises a supporting means pressing against an edge the CPU during mounting for preventing tilt of the fixture.

* * * * *